(12) United States Patent
Wang

(10) Patent No.: US 11,686,430 B2
(45) Date of Patent: Jun. 27, 2023

(54) MOBILE DEVICE POSITIONING STRUCTURE

(71) Applicant: Albert Ming Hwa Wang, Syosset, NY (US)

(72) Inventor: Albert Ming Hwa Wang, Syosset, NY (US)

(*) Notice: Subject to any disclaimer, the term of this patent is extended or adjusted under 35 U.S.C. 154(b) by 1 day.

(21) Appl. No.: 17/389,198

(22) Filed: Jul. 29, 2021

(65) Prior Publication Data

US 2023/0011854 A1 Jan. 12, 2023

(30) Foreign Application Priority Data

Jul. 12, 2021 (TW) .................................. 110125493

(51) Int. Cl.
*H01F 7/02* (2006.01)
*F16M 13/02* (2006.01)

(52) U.S. Cl.
CPC ............... *F16M 13/02* (2013.01); *H01F 7/02* (2013.01)

(58) Field of Classification Search
CPC .. F16M 13/02; H01F 7/02; H04M 1/04; H02J 7/0044; B60R 11/0241; B60R 2011/007
See application file for complete search history.

(56) References Cited

U.S. PATENT DOCUMENTS

| | | | |
|---|---|---|---|
| 9,749,002 B1* | 8/2017 | Fan | H04M 1/04 |
| 10,259,400 B1* | 4/2019 | Song | B60R 11/0241 |
| 10,703,297 B1* | 7/2020 | Cohen | B60N 3/103 |
| 2014/0097306 A1* | 4/2014 | Hale | H04M 1/12 248/274.1 |

* cited by examiner

Primary Examiner — Terrell L McKinnon
Assistant Examiner — Jerry Olivier

(57) ABSTRACT

The present invention discloses a mobile device positioning structure including, a central magnetic portion on a mounting surface of a fixture for magnetically positioning the back of a mobile device and a ring-shaped magnetic portion formed by two curved clamp arms which are bilaterally symmetrical to each other, and separated and unfolded from each other. After the two curved clamp arms are unfolded relative to the mounting surface, the back of the mobile device is magnetically positioned by the central magnetic portion, and both sides of the mobile device are elastically abutted, clamped and positioned by the two curved clamp arms.

5 Claims, 10 Drawing Sheets

MOBILE DEVICE POSITIONING STRUCTURE

FIELD OF INVENTION

The present invention relates to a mobile device positioning structure capable of installing a mobile device such as an automotive satellite navigator, a smartphone, etc. at any position, and the technical content, in particular to the mobile device positioning structure having a central magnetic portion and a ring-shaped magnetic portion on a mounting surface of a fixture for magnetically positioning the back of the mobile device, and the ring-shaped magnetic portion can be unfolded and has the function of clamping the mobile device.

BACKGROUND OF INVENTION

Description of the Related Art

The positioning structure for fixing a mobile device such as an automotive satellite navigator or a smartphone available on the market is mainly divided into two types: a clamping type and a magnetic type, and the mobile device can be installed in a car, on a motorcycle, or at anywhere a user needs, in order to provide a convenient operation to the user.

In general, a conventional clamping positioning structure uses a spring, a gripper or other elastic components to clamp and fix the mobile device, and a conventional magnetic positioning structure uses a magnet to magnetically fix the mobile device, wherein a magnetic element is installed to the back of a protective case of the mobile device first, and the mobile device is attracted by the magnetic element of the protective case and then fixed to a central magnet of the positioning structure. In addition, there is another type of protective case of the mobile phone on the market, wherein a magnetic ring is installed to the back of such protective case, and a ring-shaped magnet is installed onto the positioning structure, so that the mobile device can be magnetically attracted and fixed onto the ring-shaped magnet on the positioning structure by the magnetic ring of the protective case, and the protective case has a space at the center of the magnetic ring provided for a wireless charging of the mobile device.

However, there are various specifications, models, and types of mobile devices and protective cases on the market, and the conventional positioning structure can only use one of the clamping, central magnetic attraction, and ring-shaped magnetic attraction methods for the positioning, but cannot universally fit various different types of mobile devices and protective cases. Obviously, the conventional mobile phones and protective cases have limited applicability and require further improvements.

In view of the aforementioned drawbacks of the prior art, the inventor of the present invention based on years of experience in the related industry to conduct extensive research and experiment, and finally developed a mobile device positioning structure to overcome the drawbacks of the prior art.

SUMMARY OF THE INVENTION

Therefore, it is a primary objective of the present invention to overcome the drawbacks of the conventional clamping and magnetic positioning structures that cannot provide a universal application to fit various different types of mobile devices and protective cases by providing a mobile device positioning structure in accordance with the present invention.

To achieve the aforementioned and other objectives, the present invention discloses a mobile device positioning structure, comprising: a mounting surface defined on a fixture and provided for stacking on the back of the external mobile device, and an underside defined on a surface opposite to the mounting surface and provided for coupling an external stand, wherein the mounting surface has a ring-shaped magnetic portion for magnetically attracting the back of the external mobile device, and each of the mounting surfaces has a sliding arm elastically and telescopically installed on the mounting surface, and the ring-shaped magnetic portion is formed by two curved clamp arms bilaterally symmetrical and separated from each other, and each of the two curved clamp arms has a magnetic topside and an abutting underside, and the two abutting undersides are stacked on the mounting surface, and each of the two sliding arms on both sides of the mounting surface has a hinge portion, so that after the two curved clamp arms are pivotally rotated from the respective hinge portions, the two curved clamp arms are unfolded relative to the mounting surface, while the sliding arms are driving the two curved clamp arms to elastically stretch and contract, and the abutting undersides of the two curved clamp arms are elastically clamped towards the middle by both sides of the fixture and abutting against both sides of the mobile device to improve the stability of the magnetic attraction.

In this way, when the abutting underside of the curved clamp arm is stacked on the mounting surface, the two curved clamp arms are engaged to form a ring, so that the magnetic topside of the clamp arm is disposed around the periphery of the mounting surface. Now, the back of the mobile device can be stacked on and can abut against the magnetic topside of the curved clamp arm of the mounting surface to magnetically attract the magnetic topside and position the mobile device. When the two curved clamp arms are lifted and unfolded to both sides of the mounting surface respectively, the two curved clamp arms can be adjusted towards a direction other than both sides of the mounting surface, so that the sliding arm can drive the two curved clamp arms to elastically stretch and contract. Now, the back of the mobile device can be stacked on the mounting surface, so that the abutting underside of the two curved clamp arms are elastically clamped towards the middle by both sides of the fixture and abut against both sides of the mobile device to clamp and position the mobile device.

In an embodiment, the mounting surface has a central magnetic portion for magnetically attracting the back of the external mobile device, and the ring-shaped magnetic portion is disposed at the external periphery of the central magnetic portion.

In an embodiment, the hinge portion comprises a first pivot and a second pivot pivotally coupled to each other, and both ends of the two sliding arm have the first pivot and a rack, and the second pivot is installed on the curved clamp arm, and the racks of the two sliding arms are guided and transmitted with each other by a gear and a swing member, and at least one spring is installed between the two sliding arms for driving the two sliding arms to stretch and contract relative to each other.

In an embodiment, the second pivot of the curved clamp arm has a protrusion, and the first pivot of the sliding arm has a first positioning slot and a second positioning slot, and the first positioning slot is provided for embedding the protrusion to position the abutting underside to the stacked position of the mounting surface, and the second positioning slot is provided for embedding the protrusion to position the curved clamp arm to the unfolded position relative to the mounting surface.

In an embodiment, the curved clamp arm has at least one first magnetic body disposed therein, and the central magnetic portion has at least one second magnetic body disposed on the mounting surface, and the fixture has a guide groove formed in the fixture and communicate with both sides of the mounting surface, and the sliding arm is slidably installed in the guide groove, and the underside of the fixture has a socket connectable to the external stand.

In another embodiment of the present invention, the mobile device positioning structure comprises a mounting surface defined on a fixture and provided for stacking on the back of the external mobile device, and an underside defined on a surface opposite to the mounting surface and provided for coupling an external stand, wherein the mounting surface has a central magnetic portion provided for magnetically attracting the back of the external mobile device, and a ring-shaped magnetic portion disposed at the outer periphery of the central magnetic portion and formed by two curved clamp arms which are bilaterally symmetrical and separated from each other, and each of the two curved clamp arms has a magnetic topside and an abutting underside, wherein the two abutting undersides are stacked on the mounting surface, and a hinge portion defined on both sides opposite to the mounting surface, so that after the two curved clamp arms are pivotally coupled to the respective hinge portions, the two curved clamp arms are unfolded relative to the mounting surface, and the abutting undersides of the two curved clamp arms elastically abut against both sides of the mobile device to increase the stability of magnetically attracting the central magnetic portion.

In this way, when the abutting underside of the curved clamp arm is stacked on the mounting surface, the two curved clamp arms are engaged to form a ring, so that the magnetic topside of the clamp arm is disposed around the periphery of the mounting surface. Now, the back of the mobile device can be stacked on and can abut against the magnetic topside of the curved clamp arm of the mounting surface to magnetically attract the magnetic topside and position the mobile device. Now, the back of the mobile device can be stacked to abut against the central magnetic portion of the mounting surface and the magnetic topside of the curved clamp arm of the mounting surface to magnetically attract the magnetic topside and position the mobile device. When the two curved clamp arms are lifted and unfolded to both sides of the mounting surface respectively, the back of the mobile device can be stacked on the central magnetic portion of the mounting surface to magnetically attract the central magnetic portion and position the mobile device. By the abutting underside of the curved clamp arm that abuts against both sides of the mobile device, the magnetic attraction of the central magnetic portion and the stability of positioning the mobile device can be improved.

In an embodiment, both sides of the mounting surface have a sliding arm elastically and telescopically installed thereon, and the hinge portions are disposed on the sliding arms on both sides of the mounting surface respectively, so that the sliding arm can drive the two curved clamp arms to elastically stretch and contract.

Compared with the conventional clamping and magnetic mobile device positioning technologies, the present invention can provide a universal application to fit different specifications and models of mobile devices as described below.

1. When a mobile device is equipped with a protective case, and the back of the protective case has a magnetic ring, the ring-shaped magnetic portion can be folded onto the mounting surface, and the ring-shaped magnetic portion attracts the magnetic ring of the protective case to achieve the effect of magnetically attracting and positioning the mobile device.

2. When the mobile device is equipped with a protective case, and the back of the protective case has a magnetic element, the ring-shaped magnetic portion can be folded onto the mounting surface, and the central magnetic portion and/or the ring-shaped magnetic portion attracts the magnetic element of the protective case to achieve the effect of magnetically attracting and positioning the mobile device.

3. When the mobile device is equipped with a protective case, and the center of the back of the protective case has a magnetic element, the central magnetic portion can be used to attract the magnetic element of the protective case, while the ring-shaped magnetic portion can be unfolded to both sides of the mounting surface both sides, so that the abutting undersides of the two curved clamp arms abut against both sides of the mobile device respectively to increase the friction of holding the mobile device, so as to improve the positioning effect.

4. When the mobile device is not equipped with a protective case, a magnetic element or a magnetic ring, the ring-shaped magnetic portion can be unfolded to both sides of the mounting surface, so that the abutting undersides of the two curved clamp arms elastically abut against both sides of the mobile device both sides to clamp and position the mobile device.

BRIEF DESCRIPTION OF THE DRAWINGS

The present invention will become clearer in light of the following detailed description of an illustrative embodiment of this invention described in connection with the drawings.

DESCRIPTION OF THE PREFERRED EMBODIMENTS

Figure 10:
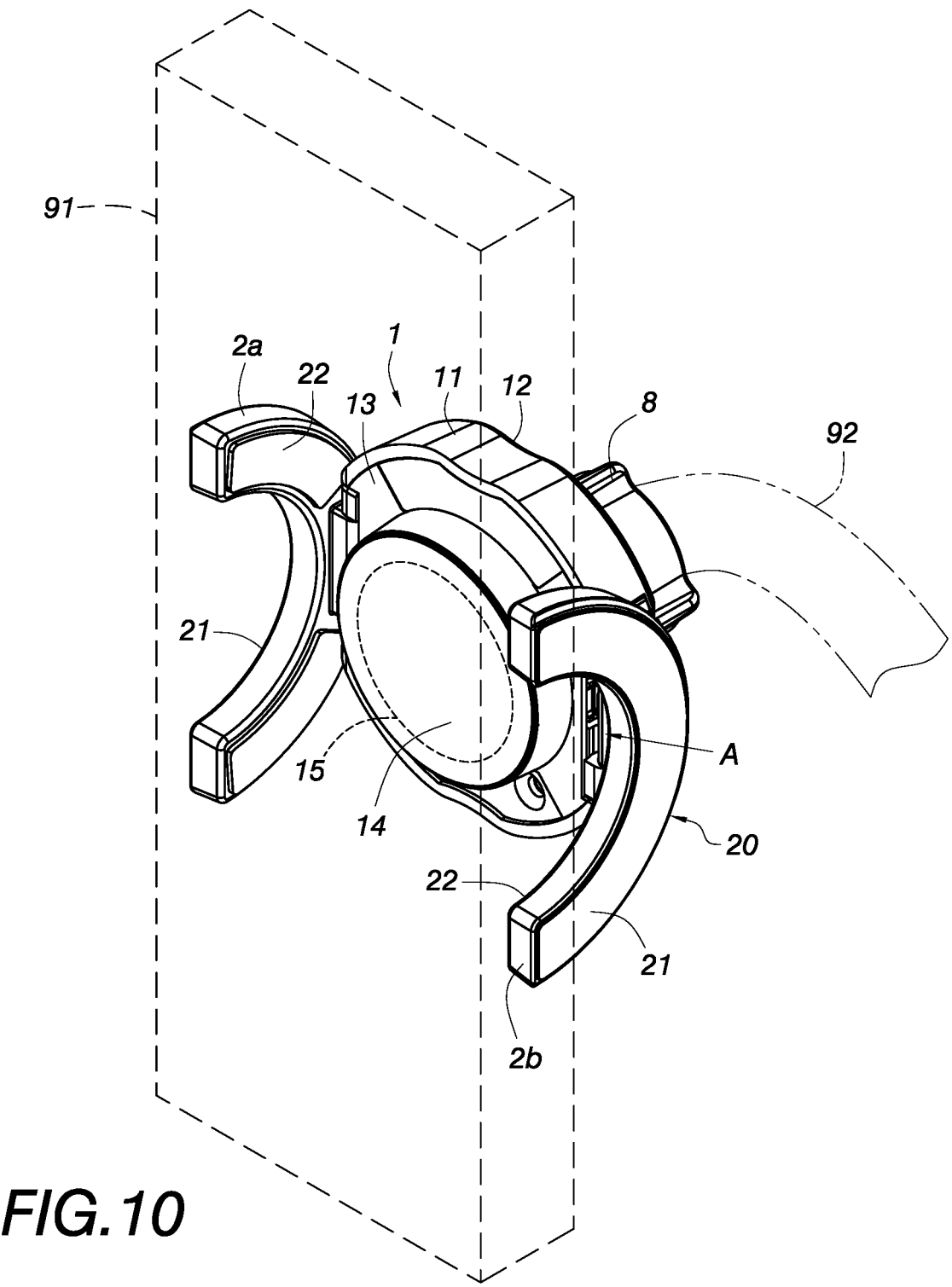
FIG. 10 is a perspective view showing an operating status of FIG. 9.

With reference to FIGS. 1 to 3 and 7 for a mobile device positioning structure in accordance with an embodiment of the present invention, the mobile device positioning structure comprises a mounting surface 14 defined on a fixture 1 and provided for stacking on the back of the external mobile device 91, and an underside 12 defined on a side opposite to the mounting surface 14 and provided for coupling an external stand 92, and the fixture 1 is formed by a base 11 and a front cover 13, and the mounting surface 14 is disposed at the front of the front cover 13, and the underside 12 is disposed at the back of the base 11. The underside 12 of the fixture 1 has a socket 8 as shown in FIGS. 8 and 10 and the socket 8 can be coupled to the external stand 92, and the stand 92 is provided for fixing the fixture 1 into a car, a motorcycle, or anywhere the user desires.

In a preferred embodiment, the mounting surface 14 comprises a ring-shaped magnetic portion 20 for magnetically attracting the back of the external mobile device 91, and a sliding arm 3a, 3b elastically and telescopically installed to both sides of the mounting surface 14. The ring-shaped magnetic portion 20 is formed by two curved clamp arms 2a, 2b which are bilaterally symmetrical to and separated from each other, and each of the two curved clamp arms 2a, 2b has a magnetic topside 21 and an abutting underside 22, and the curved clamp arm 2a, 2b has at least one first magnetic body 41 therein, wherein the first magnetic body 41 is a magnet, and the abutting underside 22 of the curved clamp arm 2a, 2b can be stacked on the mounting surface 14.

In the figure, the two curved clamp arms 2a, 2b separately have a hinge portion A disposed on the sliding arm 3a, 3b opposite to both sides of the mounting surface 14, so that the two curved clamp arms 2a, 2b can be unfolded relative to the mounting surface 14 after the curved clamp arms 2a, 2b are pivoted from the respective hinge portions A. In the meantime, the sliding arms 3a, 3b drive the two curved clamp arms 2a, 2b to elastically stretch and contract, so that the abutting undersides 22 of the two curved clamp arms 2a, 2b can abut against both sides of the mobile device 91 respectively. To provide the friction and buffering effect to the abutting underside 22, an elastic anti-skip plate can be installed to a surface of the abutting underside 22.

Figure 1:
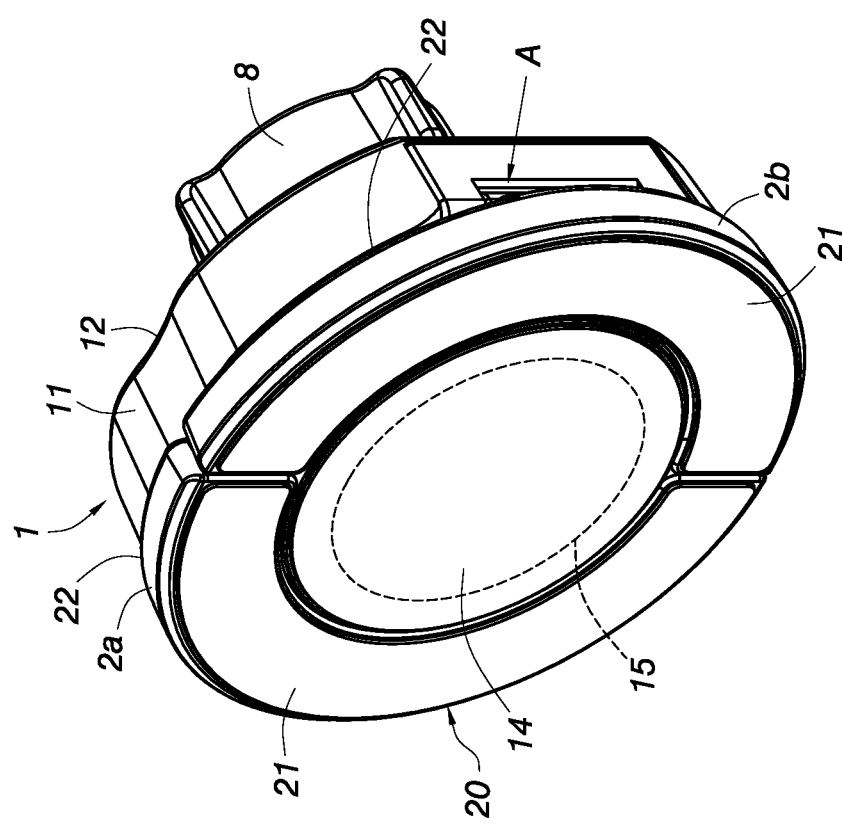
FIG. 1 is a perspective view of a preferred embodiment of the present invention.
Figure 2:
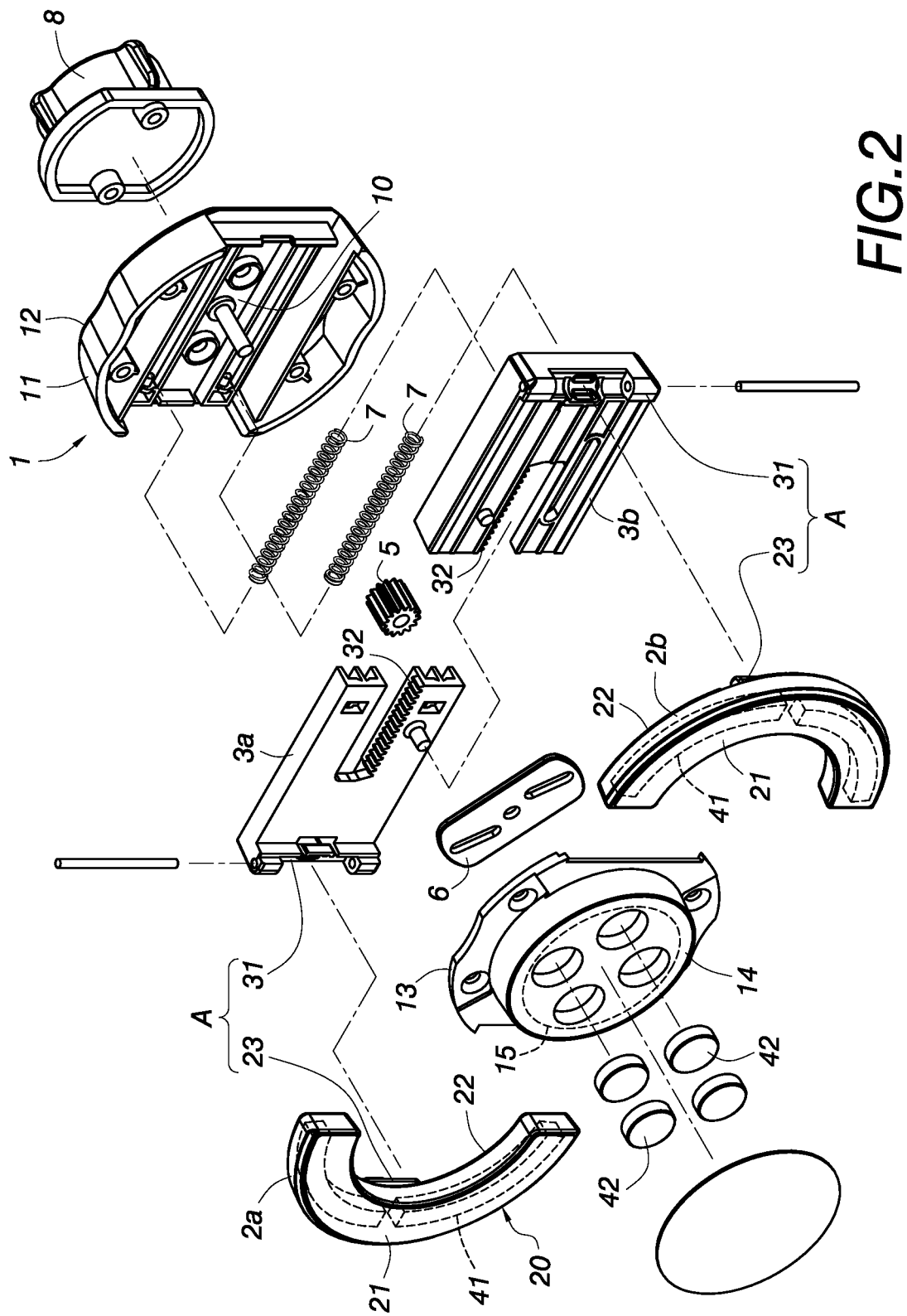
FIG. 2 is an exploded view of FIG. 1.
Figure 4:
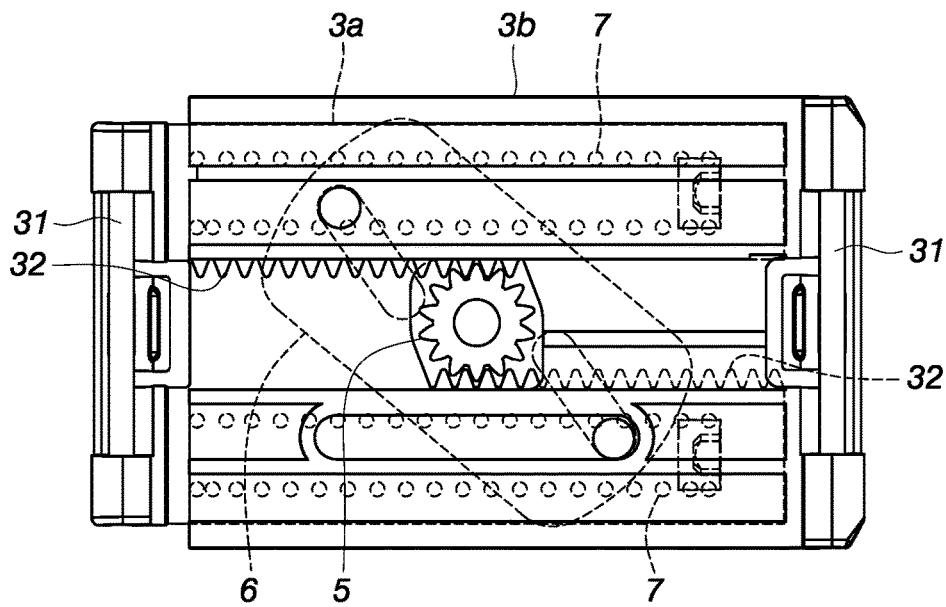
FIG. 4 is a schematic view showing a using status of the sliding arm of FIG. 2.
Figure 5:
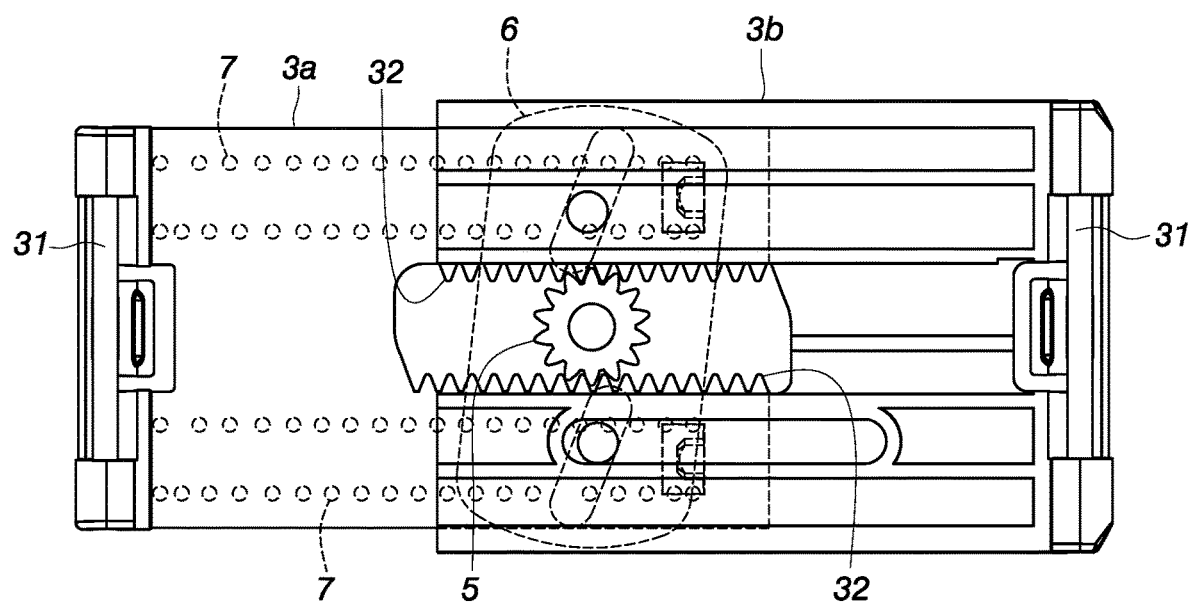
FIG. 5 is a schematic view showing another using status of FIG. 4.
Figure 6:
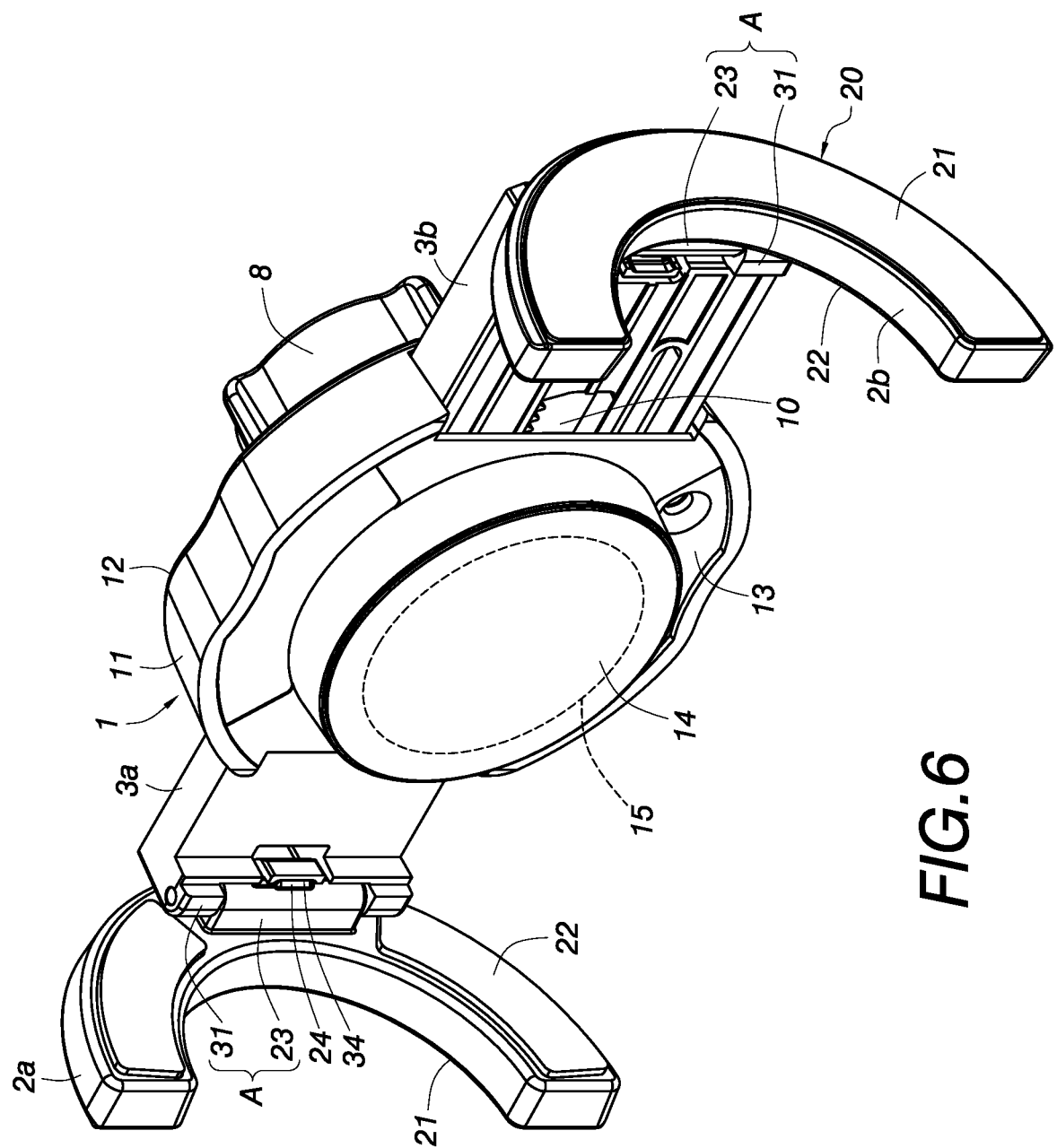
FIG. 6 is a perspective view showing an operating status of FIG. 1.

In FIGS. 2, 4 and 6, specifically, the fixture 1 has a guide groove 10 formed therein and communicating with both sides of the mounting surface 14, and the sliding arms 3a, 3b are slidably installed in the guide groove 10. The hinge portion A comprises a first pivot 31 and a second pivot 23 pivotally coupled to each other, and both ends of the sliding arm 3a, 3b have the first pivot 31 and a rack 32 respectively, and the second pivot 23 is disposed on the curved clamp arm 2a, 2b, so that the curved clamp arm 2a, 2b is pivotally coupled to the first pivot 31 of the sliding arm 3a, 3b by the second pivot 23, and the racks 32 of the two sliding arms 3a, 3b are guided and transmitted with each other by a gear 5 and a swing member 6, and at least one spring 7 is installed between the sliding arm 3a, 3b and an inner wall of the guide groove 10 for driving the two sliding arms 3a, 3b to elastically stretch and contract. In this embodiment, the spring 7 is an extension spring.

Figure 7:
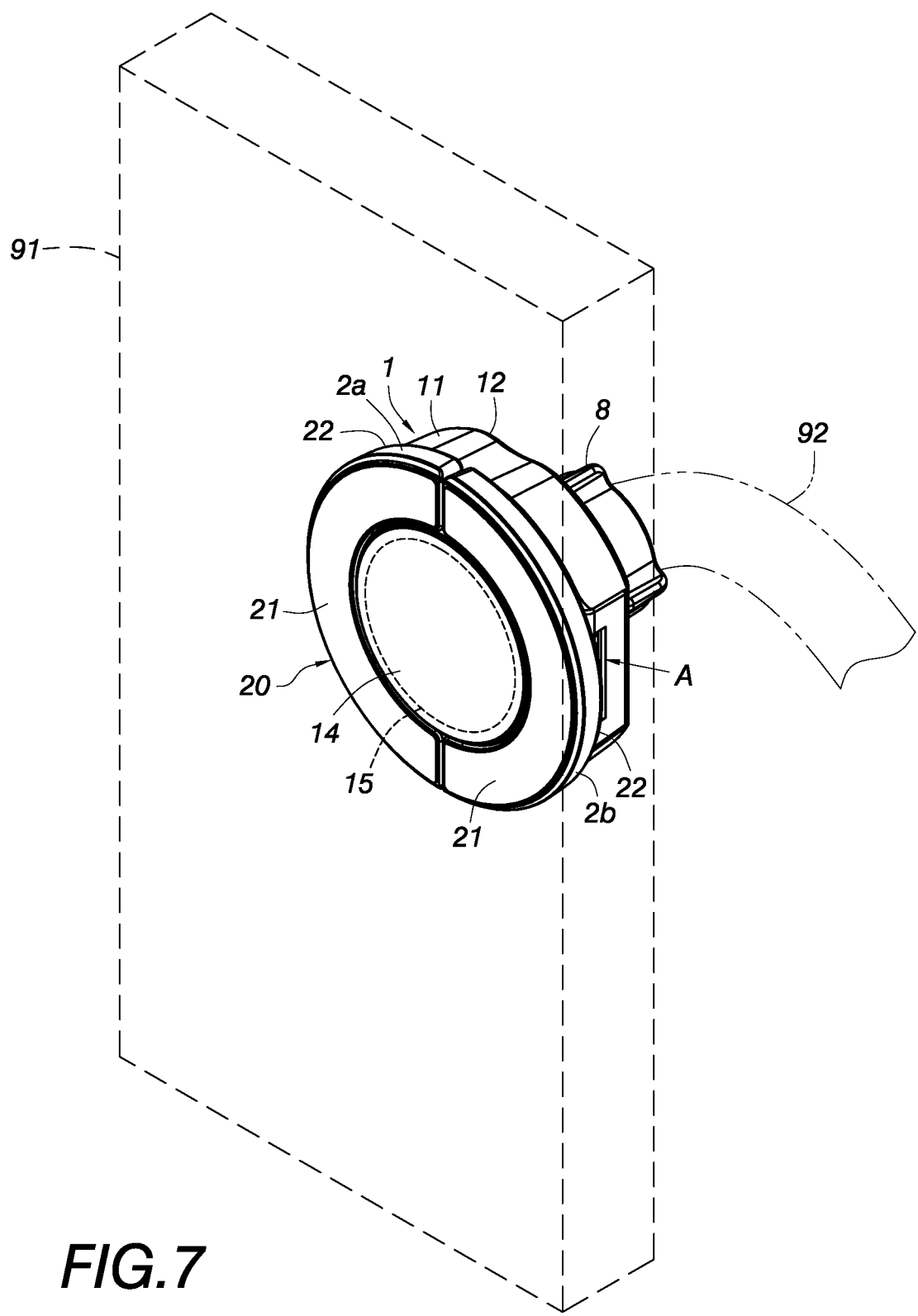
FIG. 7 is a perspective view showing a using status of FIG. 1.
Figure 8:
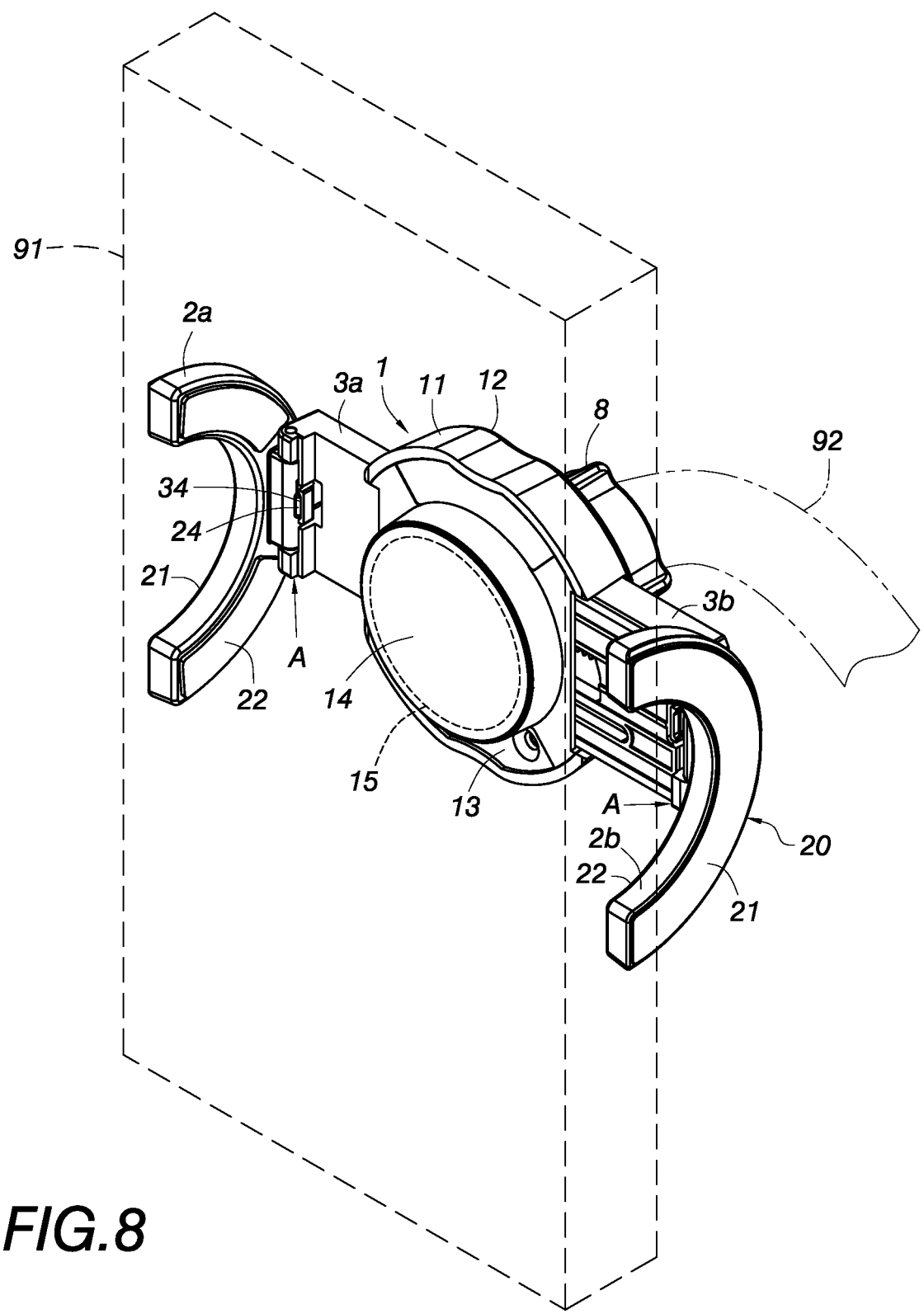
FIG. 8 is a perspective view showing an operating status of FIG. 6.

In FIG. 7, when the abutting underside 22 of the curved clamp arm 2a, 2b is stacked on the mounting surface 14, the two curved clamp arms 2a, 2b are engaged to form a ring, so that the magnetic topside 21 of the curved clamp arm 2a, 2b is disposed around the periphery of the mounting surface 14. Now, the back of the mobile device 91 can be stacked on the magnetic topside 21 of the curved clamp arm 2a, 2b of the mounting surface 14 and magnetically attracted by the magnetic topside 21 to position the mobile device 91. Therefore, the curved clamp arms 2a, 2b of the ring-shaped magnetic portion 20 can be used to magnetically attract and position a conventional protective case installed to the mobile device 91 having a magnetic ring.

In FIG. 8, when the two curved clamp arms 2a, 2b are lifted and unfolded to both sides of the mounting surface 14, the two curved clamp arms 2a, 2b can be adjusted towards a direction other than both sides of the mounting surface 14, so that the sliding arm 3a, 3b can drive the two curved clamp arms 2a, 2b to elastically stretch and contract. Now, the back of the mobile device 91 is stacked on the mounting surface 14, and the abutting undersides 22 of the curved clamp arm 2a, 2b are elastically clamped towards the middle by both sides of the fixture 1 to abut against both sides of the mobile device 91, so as to clamp and position he mobile device 91. Therefore, the curved clamp arms 2a, 2b of the ring-shaped magnetic portion 20 can be used to position a mobile device 91 that does not have a protective case, a central magnetic element or a magnetic ring.

With reference to FIGS. 1 to 3, 8 and 9 for another embodiment of the present invention, the mounting surface 14 comprises a central magnetic portion 15 and the ring-shaped magnetic portion 20 provided for magnetically attracting the back of the external mobile device 91, and the ring-shaped magnetic portion 20 is disposed around the periphery of the central magnetic portion 15, and the central magnetic portion 15 has at least one second magnetic body 42 embedded into the mounting surface 14, wherein the second magnetic body 42 is a magnet, and the hinge portions A are disposed on sides opposite to both sides of the mounting surface 14 respectively.

In FIG. 7, when the abutting undersides 22 of the curved clamp arms 2a, 2b are stacked on the mounting surface 14, the two curved clamp arms 2a, 2b are engaged to form a ring, so that the magnetic topsides 21 of the curved clamp arms 2a, 2b are disposed around the periphery of the central magnetic portion 15. Now, the back of the mobile device 91 is stacked on the central magnetic portion 15 of the mounting surface 14 and the magnetic topsides 21 of the curved clamp arms 2a, 2b, so as to magnetically attract and position the mobile device 91 jointly by the central magnetic portion 15 and/or the magnetic topside 21. Therefore, the central magnetic portion 15 and/or the ring-shaped magnetic portion 20 can be used to magnetically attract and position a conventional mobile device 91 having a protective case, a magnetic ring and/or a central magnetic element.

In FIG. 10, when the two curved clamp arms 2a, 2b are lifted and unfolded to both sides of the mounting surface 14, the back of the mobile device 91 can be stacked on the central magnetic portion 15 of the mounting surface 14, so that the central magnetic portion 15 can magnetically attract and position the mobile device 91. In the meantime, the abutting undersides 22 of the curved clamp arms 2a, 2b abut against both sides of the mobile device 91 respectively. Therefore, the central magnetic portion 15 can be used to magnetically attract and position a mobile device 91 with a conventional protective case having a central magnetic element, and the ring-shaped magnetic portion 20 can be used to clamp and position the mobile device 91 to increase the friction for positioning the mobile device 91 on the fixture 1 and further provide the anti-slip and secured holding effect, so as to improve the stability of magnetically attracting and positioning the mobile device 91 by the central magnetic portion 15.

With reference to FIGS. 1 to 6 and 8 for a further embodiment of the present invention, the mounting surface 14 has the central magnetic portion 15 for magnetically attracting the back of the external mobile device 91, and the ring-shaped magnetic portion 20 disposed around the periphery of the central magnetic portion 15, and the sliding arms 3a, 3b are elastically and telescopically installed to both sides of the mounting surface 14 respectively, and the hinge portions A are disposed on the sliding arms 3a, 3b on both sides of the mounting surface 14, so that the sliding arms 3a, 3b can drive the two curved clamp arms 2a, 2b to elastically stretch and contract.

In FIG. 7, when the abutting undersides 22 of the curved clamp arms 2a, 2b are stacked on the mounting surface 14, the two curved clamp arms 2a, 2b are engaged to form a ring, and the magnetic topsides 21 of the curved clamp arms 2a, 2b are disposed around the periphery of the central magnetic portion 15. Now, the back of the mobile device 91 can be stacked on the central magnetic portion 15 of the mounting surface 14 and the magnetic topsides 21 of the curved clamp arms 2a, 2b, so as to magnetically attract and position the mobile device 91 jointly by the central magnetic portion 15 and the magnetic topside 21.

In FIG. 8, the two curved clamp arms 2a, 2b can be lifted and unfolded to both sides of the mounting surface 14, while the two curved clamp arms 2a, 2b are adjusted to face the direction other than both sides of the mounting surface 14, so that the sliding arms 3a, 3b can drive the two curved clamp arms 2a, 2b to elastically stretch and contract. Now, the back of the mobile device 91 can be stacked on the central magnetic portion 15 of the mounting surface 14, so that the abutting undersides 22 of the curved clamp arms 2a, 2b elastically clamp and abut against both sides of the mobile device 91, so as to provide the positioning effect with both magnetic attraction and clamping, and improve the stability magnetically attracting and positioning the mobile device 91 by the central magnetic portion 15.

Figure 3:
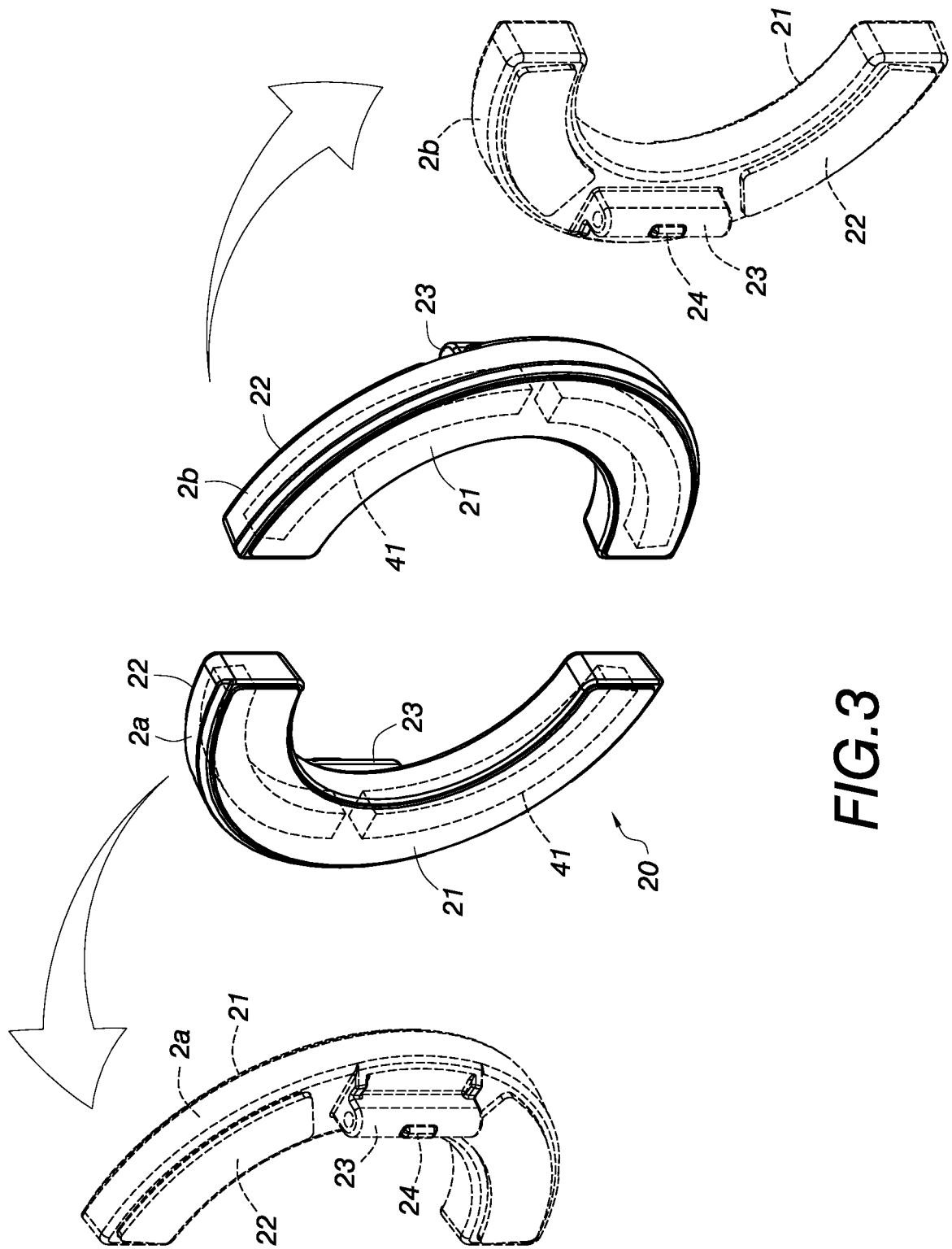
FIG. 3 is a partial blowup view of FIG. 2.
Figure 9:
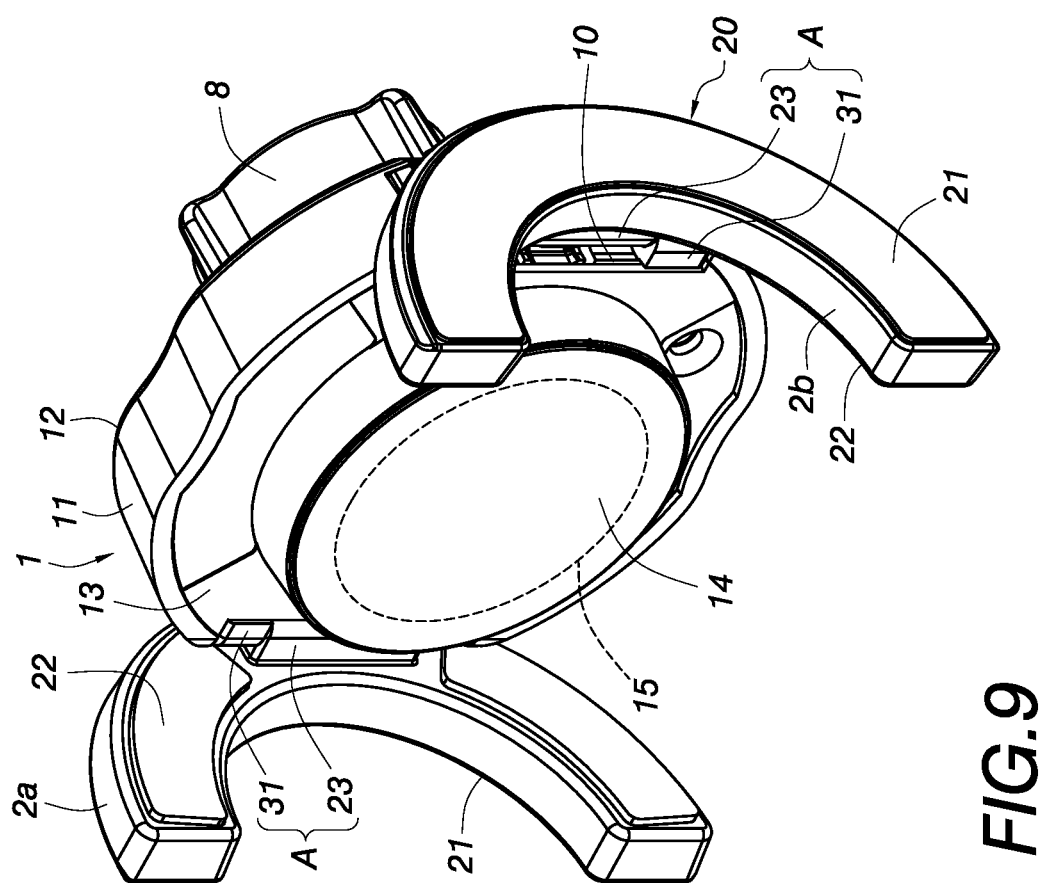
FIG. 9 is a schematic view showing another using status of FIG. 1.
Figure 11:
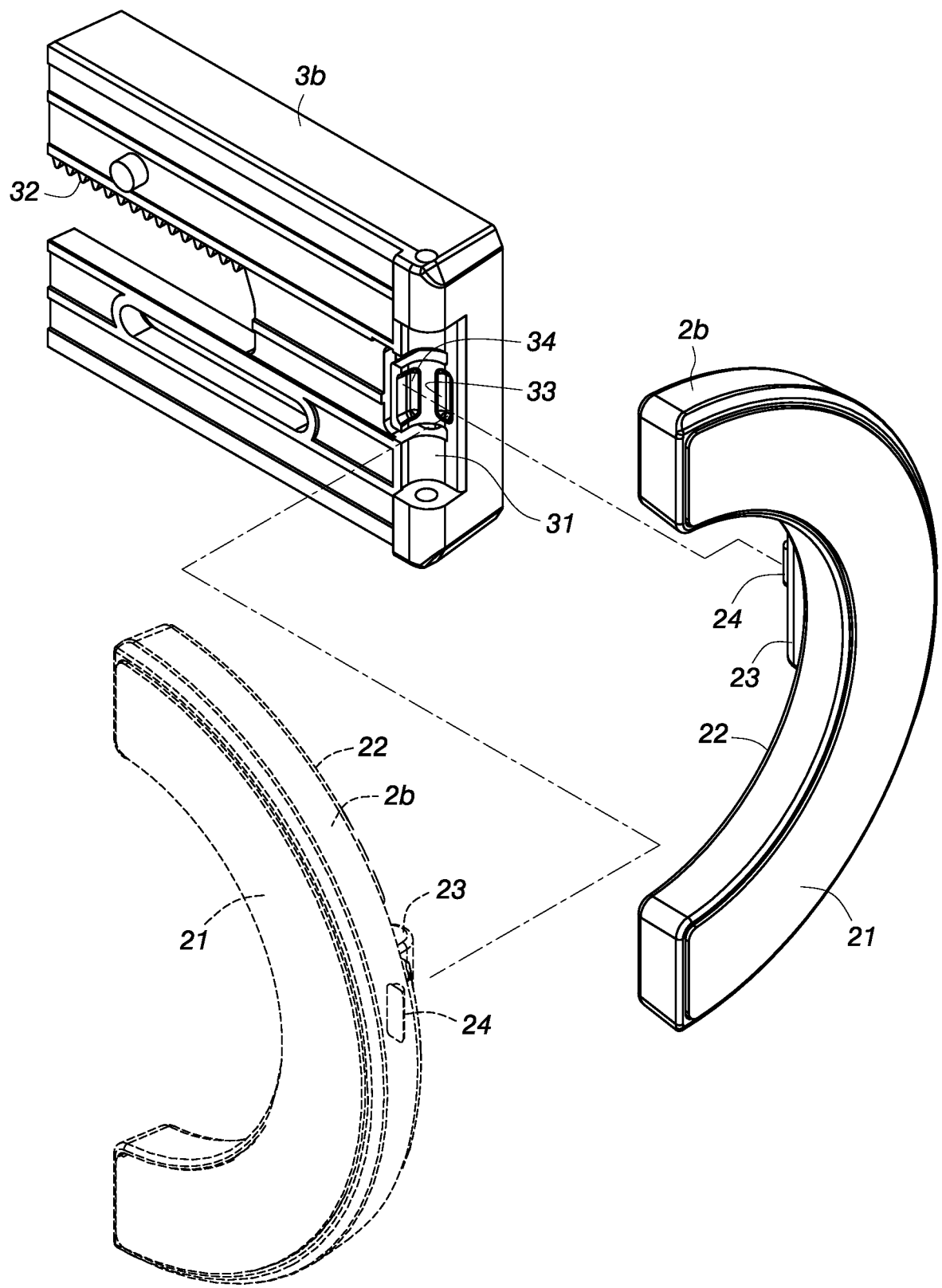
FIG. 11 is another partial blowup view of FIG. 2.

In FIGS. 2, 3 and 11, the second pivot 23 of the curved clamp arms 2a, 2b has a protrusion 24, and the first pivot 31 of the sliding arms 3a, 3b has a first positioning slot 33 and a second positioning slot 34, and the first positioning slot 33 is provided for embedding the protrusion 24 to position the abutting underside 22 to the stacked position of the mounting surface 14 as shown in FIGS. 6 and 9, and the second positioning slot 34 is provided for embedding the protrusion 24 to position the curved clamp arms 2a, 2b to the positions opposite to the folded positions of the mounting surface 14.

While the invention has been described by means of specific embodiments, numerous modifications and variations could be made thereto by those skilled in the art without departing from the scope and spirit of the invention set forth in the claims.

What is claimed is:

1. A mobile device positioning structure, comprising:
   a mounting surface defined on a fixture and provided for stacking on a back of an external mobile device, and
   an underside defined on a surface opposite to the mounting surface and provided for coupling to an external stand,
   characterized in that:
   the mounting surface has a ring-shaped magnetic portion for magnetically attracting the back of the external mobile device, and opposite sides of the mounting surface each have a sliding arm elastically installed thereon, the sliding arms movable with respect to each other, and the ring-shaped magnetic portion is formed by two curved clamp arms bilaterally symmetrical and separated from each other, and each of the two curved clamp arms has a magnetic topside and an abutting underside, and the two abutting undersides are stackable on the mounting surface, and each of the two sliding arms on opposite sides of the mounting surface has a hinge portion, so that the two curved clamp arms are pivotally rotated from the respective hinge portions, the two curved clamp arms are unfolded relative to the mounting surface, the sliding arms driving the two curved clamp arms to elastically stretch and contract, and the abutting undersides of the two curved clamp arms are configured to elastically clamped and position the mobile device;
   wherein the fixture has a guide groove formed therein and communicating with opposite sides of the mounting surface, and the two sliding arms are slidably installed in the guide groove, and the underside of the fixture has a socket connectable to the external stand;
   wherein each of the two hinge portions comprise a first pivot and a second pivot pivotally coupled to each other, and each end of the two sliding arms has the first pivot and a rack, and each of the two curved clamp arms has the second pivot, and the racks of the two sliding arms are guided and transmitted with each other by a gear and a swing member, and at least one spring is installed between the two sliding arms for driving the two sliding arms to stretch and contract relative to each other; and
   wherein each of the second pivots of the two curved clamp arms has a protrusion, and each of the first pivots of the two sliding arms has a first positioning slot and a second positioning slot, and the two first positioning slots are provided for embedding the corresponding protrusions to position the two abutting undersides at the stacked positions on the mounting surface, and the two second positioning slots are provided for embedding the corresponding protrusions to position the two curved clamp arms at the unfolded positions relative to the mounting surface respectively.

2. The mobile device positioning structure according to claim 1, wherein the mounting surface has a central magnetic portion for magnetically attracting the back of the external mobile device, and the ring-shaped magnetic portion is disposed at the external periphery of the central magnetic portion.

3. The mobile device positioning structure according to claim 2, wherein the two curved clamp arms each have at least one first magnetic body disposed therein, and the central magnetic portion has at least one second magnetic body disposed on the mounting surface.

4. A mobile device positioning structure, comprising:
   a mounting surface defined on a fixture and provided for stacking on a back of an external mobile device, and
   an underside defined on a surface opposite to the mounting surface and provided for coupling to an external stand,
   wherein the mounting surface has a central magnetic portion provided for magnetically attracting the back of the external mobile device, and a ring-shaped magnetic portion disposed at an outer periphery of the central magnetic portion and formed by two curved clamp arms which are bilaterally symmetrical and separated from each other, and each of the two curved clamp arms has a magnetic topside and an abutting underside, wherein the two abutting undersides are stackable on the mounting surface, and a respective hinge portion is defined on opposite sides of the mounting surface, the two curved clamp arms pivotally coupled to the respective hinge portions, the two curved clamp arms unfoldable relative to the mounting surface, and the abutting undersides of the two curved clamp arms configured to elastically abut against opposite sides of the mobile device to increase stability of magnetic attraction to the central magnetic portion;

wherein the fixture has a guide groove formed therein and opposite sides of the mounting surface have a respective sliding arm installed thereto, the sliding arms elastically movably engaged with each other, and the two hinge portions are respectively disposed on one the sliding arms, so that the two sliding arms can drive the two curved clamp arms respectively to elastically stretch and contract;

wherein the two hinge portions comprise a first pivot and a second pivot pivotally coupled to each other, and each end of the two sliding arms has one of the first pivots and a rack, and each of the two curved clamp arms has one of the second pivots, and the racks of the two sliding arm are guided and transmitted with each other by a gear and a swing member, and at least one spring is installed between the two sliding arms for driving the two sliding arms to stretch and contract; and wherein each of the second pivots of the two curved clamp arms has a protrusion, and each of the first pivots of the two sliding arms has a first positioning slot and a second positioning slot, and the two first positioning slots are provided for embedding the corresponding protrusions to position the two abutting undersides at the stacked positions on the mounting surface, and the two second positioning slots are provided for embedding the corresponding protrusions to position the two curved clamp arms at the unfolded positions relative to the mounting surface respectively.

5. The mobile device positioning structure according to claim 4, wherein each of the two curved clamp arms has at least one first magnetic body disposed therein, and the central magnetic portion has at least one second magnetic body disposed on the mounting surface, and the underside of the fixture has a socket connectable to the external stand.

* * * * *